United States Patent [19]

Gaworowski et al.

[11] Patent Number: 4,770,928

[45] Date of Patent: Sep. 13, 1988

[54] METHOD OF CURING A COMPRESSIBLE PRINTING BLANKET AND A COMPRESSIBLE PRINTING BLANKET PRODUCED THEREBY

[75] Inventors: Andrew J. Gaworowski; Mayo B. Tell, both of Asheville, N.C.

[73] Assignee: Day International Corporation, Dayton, Ohio

[21] Appl. No.: 871,982

[22] Filed: Jun. 9, 1986

Related U.S. Application Data

[63] Continuation of Ser. No. 565,663, Dec. 27, 1983, abandoned.

[51] Int. Cl.$^4$ .......................... B32B 3/26; C08J 9/32; B41N 1/00
[52] U.S. Cl. .............................. 428/284; 101/401.1; 428/313.5; 428/314.2; 428/909; 521/54; 523/218
[58] Field of Search .................. 101/395, 401.1, 401.2, 101/401.3, 401; 428/313.3, 313.5, 313.9, 909, 246, 284, 314.2; 521/54; 523/218, 219

[56] References Cited

U.S. PATENT DOCUMENTS

| | | | |
|---|---|---|---|
| 3,515,625 | 6/1970 | Sedlak et al. | 428/314.4 |
| 3,700,541 | 10/1972 | Shrimpton et al. | 428/313.5 |
| 3,795,568 | 3/1974 | Rhodarmer et al. | 428/314.4 |
| 3,887,750 | 6/1975 | Duckett et al. | 428/297 |
| 3,983,287 | 9/1976 | Goossen et al. | 428/241 |
| 4,025,685 | 5/1977 | Haren et al. | 428/248 |
| 4,042,743 | 8/1977 | Larson | 428/313.5 |
| 4,093,764 | 6/1978 | Duckett et al. | 428/113 |
| 4,303,721 | 12/1981 | Rodriguez | 428/113 |

FOREIGN PATENT DOCUMENTS

| | | |
|---|---|---|
| 1327758 | 8/1973 | United Kingdom . |
| 1400932 | 7/1975 | United Kingdom . |

*Primary Examiner*—William J. Van Balen
*Attorney, Agent, or Firm*—Killworth, Gottman, Hagan & Schaeff

[57] ABSTRACT

A laminated printing blanket having compressible and resilient properties and a method for its production are provided. The compressible characteristics are provided by disposing an intermediate layer having substantially uniformly distributed voids of substantially uniform size between the base layer and the surface layer of the printing blanket. The voids of the compressible intermediate layer are formed by introducing microcapsules into an elastomeric compound formulated for production of the intermediate layer, and by vulcanizing the intermediate layer at a temperature below the melting point of the microcapsules to a degree sufficient to fix the microcapsules in place within the structure of the intermediate layer. A final vulcanizing step completes the curing of all layers to produce a laminated unitary blanket.

26 Claims, 1 Drawing Sheet

METHOD OF CURING A COMPRESSIBLE PRINTING BLANKET AND A COMPRESSIBLE PRINTING BLANKET PRODUCED THEREBY

This is a continuation of application Ser. No. 565,663, filed Dec. 27, 1983, abondoned.

BACKGROUND OF THE INVENTION

1. Field of the Invention

This invention relates to a method of curing printing blankets and printing blankets produced thereby, and in particular relates to a compressible printing blanket of the type used in offset lithographic printing.

2. Prior Art Statement

The use of blankets in offset lithography is well known and has a primary function of transferring ink from a printing plate to paper. Printing blankets are very carefully designed so that the surface of the blanket is not damaged either by the mechanical contact of the blanket with the parts of the press or by chemical reaction with the ink ingredients. Repeated mechanical contacts cause a certain amount of compression of the blanket which must be within acceptable limits so that the image is properly reproduced. It is also important that the blanket have resiliency, i.e. be capable of eventually returning to its original thickness, and that it provide constant image transfer regardless of the amount of use to which it is put.

Printing blankets are normally composed of a substrate base material which will give the blanket integrity. Woven fabrics are preferred for this base. The base may consist of one, two, three, or more layers of fabric. The working surface, by which is meant the surface that actually contacts the ink, is usually a layer of elastomeric material such as rubber. The blanket is conventionally made by calendering or spreading rubber in layers until a desired thickness of rubber has been deposited, after which the assembly is cured or vulcanized to provide the finished blanket. Such a blanket is acceptable for many applications, but often lacks the necessary compressibility and resiliency needed for other applications. It is desirable, therefore, to produce more highly compressible blankets with improved resiliency.

It is difficult to obtain an improved compressibility factor by the standard construction described above because the rubber material, while it is highly elastomeric, is not compressible and cannot be compressed in a direction at right angles to its surface without causing a distortion or stretch of the blanket in areas adjacent to the point of compression. If irregularities exist in the printing plate, the presses, or the paper, the compression to which the blanket is exposed will vary during the operation and the irregularities in the plates, presses or paper will be magnified by the lack of compression in the printing blanket.

The key to providing a printing blanket having the desired compressibility and resiliency is in providing a compressible layer therein.

In particular, it has been found that by including at least one layer of material comprising a compressible layer of resilant polymer in a printing blanket that printing problems such as those described above as well as "blurring" (lack of definition), caused by a small standing wave in the blanket printing surface adjacent to the nip of the printing press, can be avoided. Also, a compressible layer can serve to absorb a "smash", that is a substantial deformation in the blanket caused by a temporary increase in the thickness in the material to be printed, for example, the accidental introduction of more than one sheet of paper during the printing operation. By incorporating a compressible layer in the blanket, a "smash" can be absorbed without permanent damage to the blanket or impairment of the printing quality of the blanket. In addition, a resilient, compressible layer helps to maintain the evenness of the printing surface and the thickness of the blanket during the printing operation by restoring the normal thickness of the blanket after compression at the nip of the press.

Many different means of producing a compressible layer within a printing blanket are known in the art. For example, compressible layers have been formed by mixing granular salt particles with the polymer used to produce the layer, and thereafter leaching the salt from the polymer to create voids. The voids in the layer make possible positive displacement of the surface layer without distortion of the surface layer since volume compression occurs and displacement takes place substantially prerpendicular to the impact of the press. Such a method is disclosed in Haren et al U.S. Pat. No. 4,025,685. Other methods, such as using compressible fiber structures have been used heretofore to produce compressible layers. Examples are found in Duckett et al U.S. Pat. Nos. 3,887,750 and 4,093,764. Rodriguez, U.S. Pat. No. 4,303,721 teaches a compressible blanket made using blowing agents to create voids in the compressible layer. The use of rubber particles to create voids is disclosed in Rhodarmer U.S. Pat. No. 3,795,568.

The forming of voids using blowing agents has the disadvantages that the size of the voids formed, and the interconnecting of the voids is not easily controlled. Oversized voids and interconnected voids cause some areas of the printing blanket to be more compressible and less resilient than adjacent areas of the printing blanket, which results in deformations during printing. The leaching of salts from a polymer matrix has the disadvantages that the particle sizes used are limited, and that the leaching step is difficult, time consuming and expensive.

More recently, it has been found preferable to produce printing blankets having a compressible layer comprising a cellular resilient polymer having cells or voids in the compressible layer in the form of discrete microcells. It has been found particularly advantageous to produce a compressible layer by incorporating hollow microcapsules in the polymer, as illustrated by Shrimpton et al in U.S. Pat. No. 3,700,541 and corresponding British Pat. No. 1,327,758; and by Larson in U.S. Pat. No. 4,042,743.

In prior art methods of producing a compressible layer for a printing blanket employing microcapsules, it has been found that the thickness of the compressible layer formed is not easily controlled since microcapsules most suitable for this use will melt at a temperature lower than the vulcanizing temperature used for vulcanizing the printing blankets. Since the microcapsules melt before the vulcanization is complete, and before the compressible layer achieves a set structure, agglomeration of the voids created by the microcapsules occurs, and size variations in the voids also occur. This can affect the overall performance properties of the blanket. Also, the variations in the sizes of the voids can weaken the printing blanket and cause the printing blanket to wear out prematurely.

SUMMARY OF THE INVENTION

It is a feature of the present invention to overcome the deficiencies in the prior art printing blankets described above.

The present invention provides a method of making a laminated printing blanket by forming a base ply and a surface layer; and disposing therebetween an intermediate compressible layer formed by incorporating microcapsules in an elastomeric matrix.

In the method of the invention, an elastomeric compound including the microcapsules is provided, the improvement comprises adding an accelerator capable of permitting vulcanization of the elastomeric compound at a temperature ranging from 110° F.–170° F., over a time period ranging from 1 to 12 hours; subjecting the compound to these temperature and time conditions, which are below the melting point of the microcapsules; to cause vulcanization of the compound to form the intermediate layer; and then laminating all the layers and creating a unitary printing blanket by finally vulcanizing the assembly under controlled heat and pressure. The final product comprises a laminated printing blanket comprising a base ply, a surface layer, and a compressible intermediate layer disposed therebetween, the improvement being that said intermediate layer has a closed-cell cellular structure having substantially uniform thickness and substantially evenly distributed voids of substantially uniform size, in which the voids are not interconnected. Additional reinforcing fabric layers are usually incorporated therein.

Other details, features, objects, uses, and advantages of this invention will become apparent from the embodiments thereof presented in the following specification, claims and drawings.

DESCRIPTION OF THE PREFERRED EMBODIMENTS

Figure 1:
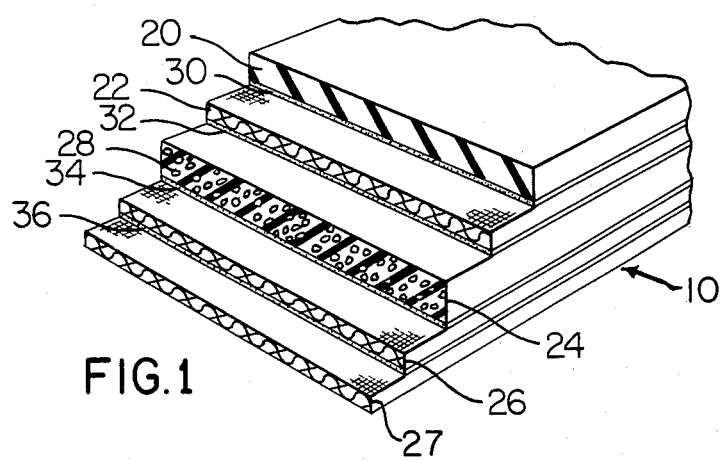
FIG. 1 illustrates a cross section of a printing blanket of the present invention, indicating the relationship of the layers.

Reference is now made to FIG. 1 which illustrates a printing blanket made according to the instant invention. The printing blanket 10 comprises a surface layer 20, a reinforcing fabric layer 22, a compressible layer 24, and at least one additional layer of fabric as a substrate or base. For purposes of illustration, two substrate fabric layers 26 and 27 are shown in the drawing. Those skilled in the art will recognize that the number and types of layers used can vary depending on the uses intended. Adhesive layers 30, 32, 34 and 36 are preferred to ensure sufficient bonding between the different layers in the blanket. Voids 28 in the compressible layer 24 make possible displacement of the surface layer 20 without distortion thereof under operating conditions. As illustrated in the drawing, the voids 28 in the compressible layer 24 have substantially uniform size and substantially uniform distribution and are not interconnected. It has been found that the dimensions of the voids 28 produced in the compressible layer 24 are generally in the same range as the dimensions of the microcapsules used to create the voids. In general, the voids will be in the range of 10–125 microns in diameter, and preferably 20–60 microns.

The compressible layer 24 is formed by an elastomeric compound having the usual processing, stabilizing, strengthening and curing additives and is formulated with reference to its specific application. As is known in the art, this formulation is different than the one used for the surface layer 20. Any suitable polymeric material which is considered a curable or vulcanizable material can be used; for example, natural rubber, styrene-butadiene rubber (SBR), EPDM (ethylene/propylene/non-conjugated diene ter-polymer rubber), butyl rubber, butadiene, acrylonitrile rubber (NBR), polyurethanes etc. An elastomer which is resistant to solvents and ink is preferable.

The adhesive layers 30, 32, 34 and 36 may be any suitable elastomeric adhesive known in the art. Preferably the adhesive will be a rubber cement. The fabric layers 22, 26 and 27 should be made of plain woven fabric of lower extensibility in the warp direction (in the direction longitudinal to the machining of the blanket), and are typically high grade cotton yarns, which are free from slubs and knots, weaving defects, seeds, etc. The fabric may also be rayon, nylon, polyester, or mixtures thereof. When applying adhesive to any of the fabric layers, it is usually spread with a knife-over-roll-spreader. The adhesive is applied in layers until the desired thickness is obtained. Typically, a fabric layer will be about 0.003 to 0.016 in. thick.

The compressible layer 24 is formed by applying the elastomeric compound as described above, containing microcapsules, to the fabric substrate 26, also using a knife-over-roll-spreader. The elastomeric compound is brought to the desired consistency for spreading by adding a solvent. In general, a number of layers of the compound are required to make an intermediate layer 24 of the desired thickness. As each layer is applied, it is solidified, but not crosslinked, due to the evaporation of the solvent. In general, the compressible layer will be about 0.008 to 0.015 in. thick. It is preferred that the layer be about 0.011 to 0.012 in. thick.

The surface layer 20 is made using the same procedure as is described in the making of the intermediate layer, using an elastomeric compound suitable for the working face of the printing blanket 10. In general, a number of layers of compound are required to make a surface layer 20 of the desired thickness. In general, the surface layer 20 will be about 0.005 to 0.025 in. thick, preferably be about 0.010 to 0.015 in. thick. It is most preferred to provide a surface layer in the range of about 0.012 to 0.015 in. thick.

According to the present invention, conventional resinous microcapsules that are known in the art may be used in the intermediate layer. Any microcapsules having the properties described herein will be suitable for use in the present invention. Microcapsules having a melting point of about 165° F. to 270° F. can be used. Preferably, the microcapsules will melt at about 180° F. Some of the materials suitable for use in the microcapsules are phenolic resin, and thermoplastic materials such as polyvinylidene chloride. Preferably, the materials used in making the microcapsules will be thermoplastics. Examples of such materials are vinylidene chloride, methacrylate, polyvinyl chloride, acrylonitrile, and copolymers thereof. Preferably, a copolymer of acrylonitrile and vinylidene chloride will be used. Mixtures of different kinds of thermoplastic microcapsules may be used if desired. In addition, any of the resins having the properties that are described herein that are mentioned in U.S. Pat. No. 2,797,201 may be used. Of course, it is understood that these materials named are illustrative, and the present invention is not limited thereby.

The microcapsules used in the method claimed are approximately spherical in shape and range from 10 to 100 microns in diameter with an average particle size of about 30–50 microns. These capsules are formed, for example with a thin, elastic, thermoplastic shell which may be composed of vinylidene chloride/acrylonitrile copolymer or similar material. These capsules may be formed as is generally described in U.S. Pat. No. 2,797,201 or U.S. Pat. No. 3,615,972. The capsules may contain an inert gas to maintain their shape. The capsules may be mixed with the elastomeric matrix in any conventional method, such as dispersing them in a dough of the polymer. The capsules are dispersed by mixing them uniformly throughout the elastomeric matrix for a controlled time period. Because the act of mixing generates a certain amount of heat, it is preferred not to mix longer than 30 minutes. Studies made utilizing an electron microscope, of the preferred embodiment, appear to indicate that a major portion, if not substantially all of the microcapsules used in making the compressible layer are recognizable in the completed printing blanket when utilizing the method of the present invention.

The amount and the size of the specific capsules used may be based on the desired compressibility of the blanket. For example, microcapsules having an average diameter of 40 microns may be used in a ratio representing 50 percent of the elastomeric material used in the compressible layer to produce a compressible layer having 50 percent voids.

Preferably the presence of water is avoided during the incorporation of the microcapsules in the elastomer in order to avoid water vapor blowing during any subsequent heating of the polymer. For this reason, the microcapsules are preferably dried before mixing with the elastomer.

Figure 2:
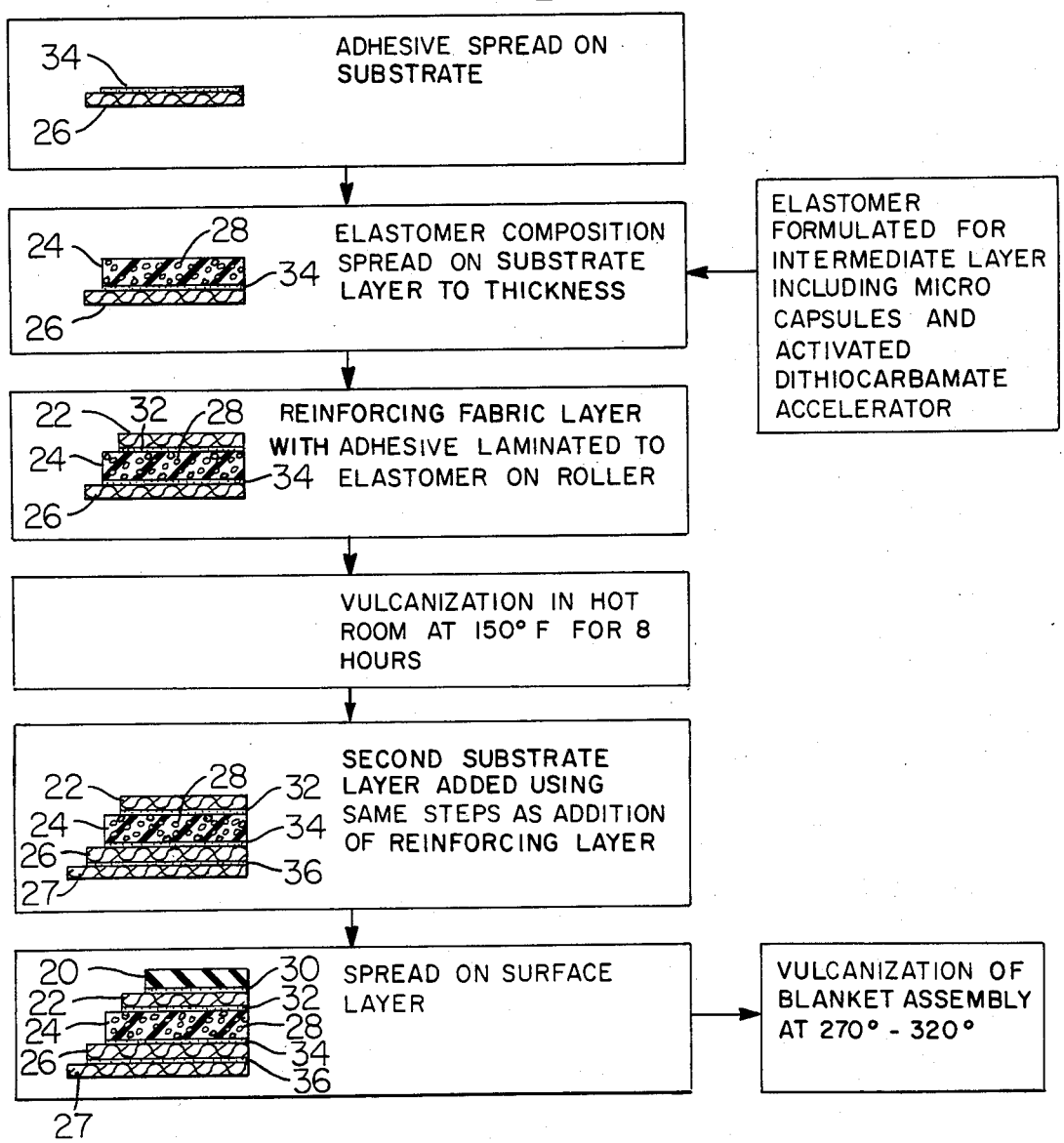
FIG. 2 is a flow diagram, illustrating the steps comprising the method of the present invention.

Reference is now made to FIG. 2 which is a flow diagram illustrating the steps in one method of preparing the printing blanket of the invention. The reference numbers used in FIG. 2 are the same as those used in FIG. 1 where the same elements are described. As noted in the flow diagram, the adhesive layer 34 is spread on the upper surface of the substrate layer 26; the compressible layer 24 is formed by mixing microcapsules and an activator or accelerator with an elastomeric compound for about 30 minutes; and the compound is spread onto the fabric substrate 26. In general, a number of layers of compound are required to obtain the desired thickness of the compressible layer. A layer of adhesive 32 is then spread on the upper surface of the layer 24, and the fabric layer 22 as bonded to the layer 24. The resulting assembly is then subjected to sufficient heat to vulcanize the layer 24 to a degree sufficient to set the structure of the polymeric matrix with the microcapsules fixed in position therein, said vulcanization being made possible by the addition of an accelerator that promotes the vulcanization at a low temperature. Vulcanization at 150° F. for 8 hours is preferred, however, a temperature range of 110° to 170° F. for periods of 1 to 12 hours may also be used. Theoretically, ambient temperatures for longer periods of time are also possible. The preferred accelerator referred to in this example is a dithiocarbamate such as the one sold under the name "butyl-eight", which is available from R. T. Vanderbilt Co. Other examples of accelerators useful in this invention are piperidinium pentamethylene dithiocarbamate (Accel 552, available from Dupont Corp), zinc dibenzyl dithiocarbamate (Arazate, available from Uniroyal), zinc dibutyl dithiocarbamate (Butyl Ziram, available from Pennwalt). This low temperature vulcanizing step creates a permanent cell structure which cannot be changed throughout the rest of the manufacturing process.

In the preferred embodiment of the invention, the low temperature vulcanization, using the accelerator, will cause optimum vulcanization of the compressible layer. That is, substantially all the sites in the polymer, which are most susceptible to crosslinking, are crosslinked in this step, said crosslinking providing the preferred elastic modulus and resiliency and other elastic properties of the elastomer. Of course, those skilled in the art will recognize that, in a rubber product, crosslinking is a continuing process, and that no rubber material is ever completely crosslinked. Therefore, those skilled in the art will recognize that the vulcanization in the low temperature cure of the compressible layer may be interrupted prior to optimum vulcanization; as long as the elastomeric matrix containing the microcapsules has set up sufficiently to "freeze" the microcapsules in position; and still obtain an acceptable product. A thus "partially" vulcanized compressible layer may obtain better crosslinking with the base layer and the printing surface. One skilled in the art will also recognize, however, that a compressible layer, which has been substantially completely vulcanized, may be crosslinked to the base layer and the surface layer by means of an adhesive specifically formulated for such a purpose.

After curing the compressible layer 24, a second substrate fabric layer 27 is laminated to the lower surface of layer 26, by means of adhesive layer 36, on laminating pinch rollers. Following this step, the working surface layer 20, compounded as described above, is applied to the upper surface of reinforcing fabric layer 22, using adhesive layer 30 to achieve a bond. The resultant assembly is then subjected to the final vulcanization process known in the art, at a temperature range of 270° F. to 320° F., and preferably 290° F. to 300° F., for one-half hour to 16 hours under pressures ranging from atmospheric to 75 psi. These variables will depend on the exact compounding.

In the final vulcanizing step, paper having a fine finish is disposed in contact with the face of the printing blanket, together with a fine talc prior to placing the blanket in the vulcanizing oven. The paper, contacting the printing blanket surface, assures the smoothness of the printing blanket, since the smoothness of the paper is imparted to the printing blanket. For most applications, the finish so provided to the printing blanket will be sufficient for its use, and grinding of the surface will not be required.

It has been found that the step of subjecting the intermediate layer to a partial vulcanization or semi-cure causes the microcapsules to be captured in stationary or set positions in the elastomeric matrix. Since the positions of the microcapsules are set in the matrix, the positions of the voids created by the microcapsules are predetermined by the position of the microcapsules in the matrix. When the assembled blanket undergoes the final vulcanization step, the already set structure of the intermediate layer holds its shape and prevents the agglomeration of voids or the collapse of voids in the layer. This fixed position will not change under final processing of the blanket.

It has been pointed out that the melting temperature of the microcapsules is below the final vulcanizing temperature. Obviously most, if not all of the microcapsules probably melt, but since they are retained within closed cells, they appear to re-form, and act as a coating of the walls of the voids. It is also possible that some of the material will partially interact with the elastomer to form a new coating substance. Electron microscope studies have confirmed that the thermoplastic material, from which the microcapsules are made, remain in the voids of the completed printing blanket. In the preferred embodiment of the invention, it is estimated that 75% to 100% of the microcapsules, added to the polymer composition, may be observed in the completed blanket. In other embodiments of the invention, 50%-100%, or as little as 25%-100% of the mocrospheres remain. Of course, as long as the voids in the compressible layer are formed as described, the presence, or absence of the microcapsules in the voids will not effect the performance of the blanket. Regardless of what happens, the previously fixed void structure remains unchanged.

The exact construction of the blanket may be varied according to its final use. For example, a single fabric substrate layer 26 may be utilized without layer 27, or a third or additional similar layers may be incorporated. It may also be desired to provide additional reinforcing fabric layers similar to layer 22.

Since, for production purposes, it is also possible to prepare a compressible layer for use as an intermediate layer in a printing blanket in one location, and to ship the compressible layer to another location for fabrication of the blanket, the compressible layer, by itself, represents a separate feature of the instant invention. The compressible intermediate layer may be prepared by the same method described above in the description of the preparation of the printing blanket, and will have generally the same parameters with regard to dimensions and distribution of voids. In such a case, it would be preferable to apply the compressible layer to at least one fabric substrate layer prior to vulcanizing and shipping. However, it is also possible to utilize a fabric or release paper as the substrate layer and reinforcing layer and strip off the compressible layer for shipping. In that case, these layers will be added later.

Also, it will be recognized by those skilled in the art that it is possible to make a complete blanket construction, including a compressible layer containing microcapsules and a dithiocarbamate activator, and subject the construction to a low temperature vulcanizing step in order to fix the microcapsules in the compressible layer as before, before subjecting the blanket construction to final vulcanization.

It is to be noted that the above description is merely illustrative of the invention, and other parameters and embodiments may be used without departing from the inventive concept herein. Accordingly, the present invention is only limited by the appended claims.

We claim:

1. A method of making a laminated printing blanket construction comprising the steps of:
    providing at least one fabric substrate layer, forming an intermediate compressible layer of an elastomeric material thereon, said intermediate compressible layer having a substantially uniform thickness and having microcapsules incorporated therein, said microcapsules being substantially uniformly distributed throughout said intermediate compressible layer,
    maintaining said intermediate compressible layer at a temperature below the melting point of said microcapsules for a time sufficient to cause said elastomeric material to vulcanize to a degree sufficient to substantially fix the positions of said microcapsules within said intermediate compressible layer,
    providing a surface layer over said intermediate compressible layer to form said printing blanket construction, and
    vulcanizing said construction to cure said layers and provide said intermediate layer with substantially uniformly distributed voids of substantially uniform size.

2. The method of claim 1 including the step of adding an accelerator to said intermediate compressible layer during formation thereof, said accelerator being capable of promoting vulcanization of said intermediate compressible layer at temperatures of between about 110 to 170 degrees F. in from about 1 to 12 hours.

3. The method of claim 1 wherein the formation step for said intermediate compressible layer includes the steps of forming said elastomeric material, incorporating said microcapsules therein to form a mixture, spreading said mixture onto said fabric substrate layer, and applying a fabric reinforcing layer over the upper surface of said intermediate compressible layer.

4. The method of claim 1 in which said construction is vulcanized at a temperature of about 270 to 320 degrees F.

5. The method of claim 1 in which said construction is vulcanized at a temperature of about 290 to 300 degrees F.

6. The method of claim 2 in which said accelerator is a dithiocarbamate.

7. The method of claim 1 in which said microcapsules are formed of a thermoplastic resin.

8. The method of claim 2 in which said step of maintaining said intermediate compressible layer below the melting point of said microcapsules is carried out at a temperature of about 110 to 170 degrees F.

9. The method of claim 1 in which said step of maintaining said intermediate compressible layer below the melting point of said microcapsules is carried out at about 150 degrees F. for a period of about 8 hours.

10. The method of claim 2 in which said accelerator is a dithiocarbamate and said microcapsules are of a copolymer of acrylonitrile and vinylidene chloride.

11. A laminated printing blanket construction comprising at least one substrate layer, a surface layer, and an intermediate compressible layer having a substantially uniform thickness, said intermediate compressible layer comprising an elastomeric material and having a cellular structure with a plurality of closed cells forming voids, said voids being of substantially uniform size and being substantially uniformly distributed throughout said intermediate compressible layer, said voids being formed by distributing microcapsules and an accelerator capable of causing vulcanization of said elastomeric material at a temperature below the melting point of said microcapsules within said intermediate compressible layer, and maintaining said intermediate compressible layer at a temperature below the melting temperature of said microcapsules for a time sufficient to cause said elastomeric material to vulcanize to a degree sufficient to substantially fix the positions of said microcapsules within said intermediate compressible layer.

12. The printing blanket of claim 11 in which said voids have a diameter in the range of from about 10 to 125 microns.

13. The printing blanket of claim 11 in which said microcapsules are formed of a thermoplastic resin.

14. The printing blanket of claim 11 in which said blanket is subjected to a final vulcanizing step at a temperature above the melting point of said microcapsules.

15. The printing blanket of claim 11 in which from about 25 to 100% of said microcapsules remain in said voids.

16. A compressible layer for use in a laminated printing blanket construction comprising an elastomeric material having a substantially uniform thickness and having a cellular structure with a plurality of closed cells forming voids, said voids being of substantially uniform size and being substantially evenly distributed throughout said compressible layer, said voids being formed by distributing microcapsules and an accelerator capable of causing vulcanization of said elastomeric material at a temperature below the melting point of said microcapsules within said compressible layer, and maintaining said compressible layer at a temperature below the melting temperature of said microcapsules for a time sufficient to cause said elastomeric material to vulcanize to a degree sufficient to substantially fix the positions of said microcapsules within said compressible layer.

17. The compressible layer of claim 16 in which said voids have a diameter in the range of from about 10 to 125 microns.

18. The compressible layer of claim 16 in which said microcapsules are formed of a thermoplastic resin.

19. The compressible layer of claim 16 in which said compressible layer is subjected to a final vulcanizing step at a temperature above the melting point of said microcapsules.

20. The compressible layer of claim 16 in which from about 25 to 100% of said microcapsules remain in said voids.

21. A method of making a compressible layer for use in a laminated printing blanket construction comprising the steps of:
forming said compressible layer of an elastomeric material and mixing microcapsules with said elastomeric material so that said microcapsules are substantially uniformly distributed therein,
maintaining said compressible layer at a temperature below the melting point of said microcapsules for a time sufficient to cause said elastomeric material to vulcanize to a degree sufficient to substantially fix the positions of said microcapsules within said compressible layer,
thereby providing a compressible layer having a substantially uniform thickness with said microcapsules being substantially uniformly distributed throughout said compressible layer.

22. The method of claim 21 including the step of adding an accelerator to said compressible layer during formation thereof, said accelerator being capable of promoting vulcanization of said compressible layer at temperatures of between about 110 to 170 degrees F. in from about 1 to 12 hours.

23. The method of claim 22 in which said accelerator is a dithiocarbamate.

24. The method of claim 21 in which said microcapsules are formed of a thermoplastic resin.

25. The method of claim 21 in which said step of maintaining said compressible layer below the melting point of said microcapsules is carried out at a temperature of about 110 to 170 degrees F.

26. The method of claim 22 in which said accelerator is a dithiocarbamate and said microcapsules are of a copolymer of acrylonitrile and vinylidene chloride.

* * * * *